July 24, 1951  L. HOLMES ET AL  2,561,512
QUANTITY INDICATOR FOR DRAW BENCHES OR THE LIKE
Filed Oct. 29, 1946
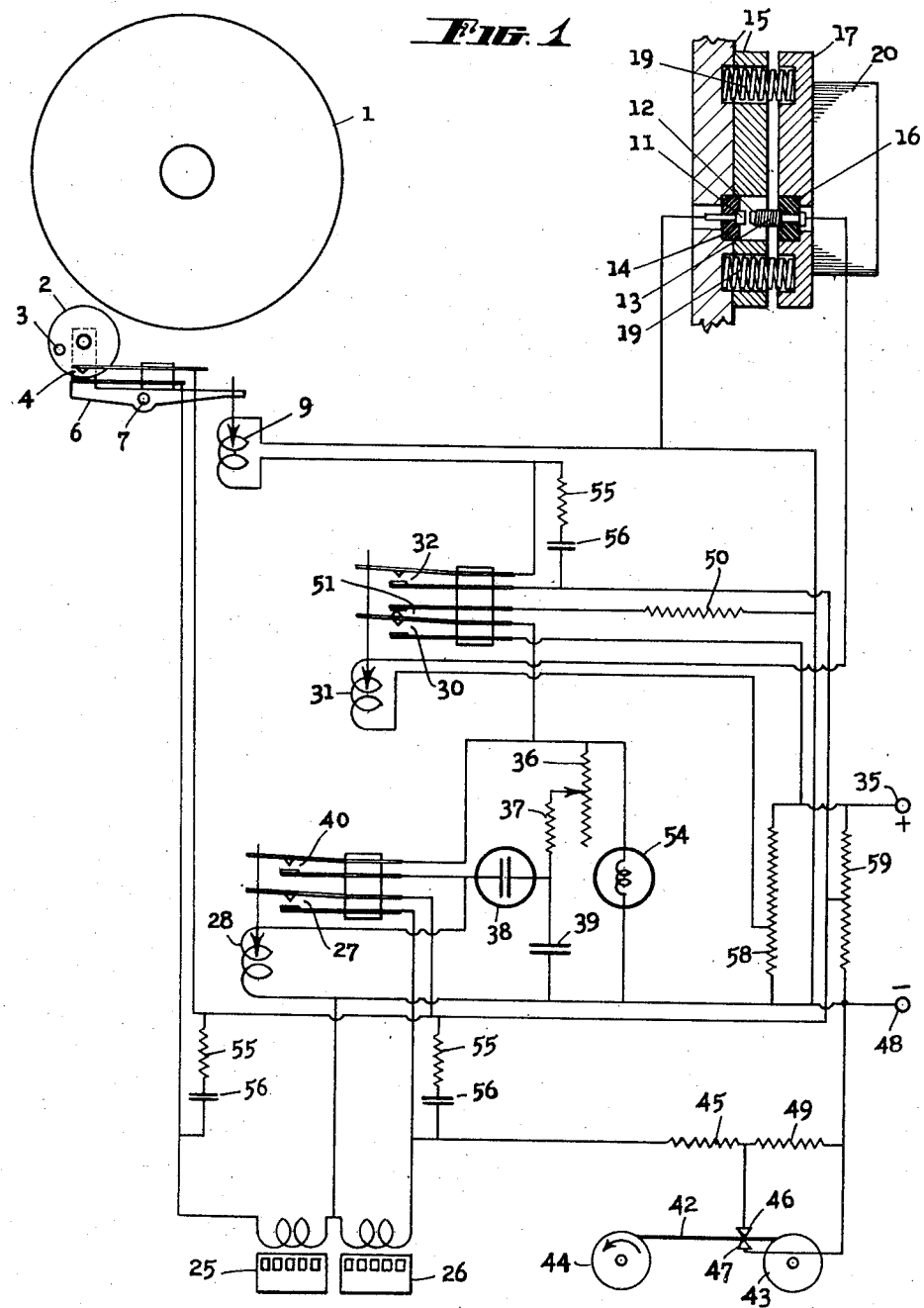
Inventors
LESLIE HOLMES
EDWARD OCTAVIUS BURNARD
+ JOHN BERNARD HIGGS
By Haseltine Lake & Co.
Attorneys Patented July 24, 1951

2,561,512

UNITED STATES PATENT OFFICE 2,561,512

QUANTITY INDICATOR FOR DRAWBENCHES OR THE LIKE

Leslie Holmes, Prospect, Edward O. Burnard, Glandore, and John B. Higgs, Prospect, Australia, assignors to British Tube Mills (Australia) Proprietary Limited, Kilburn, Australia Application October 29, 1946, Serial No. 706,370
In Australia November 19, 1945

6 Claims. (Cl. 235—98)

This invention relates to a quantity indicator for draw benches or the like and in particular it relates to a device which will show the footage and/or number of tubes or the like drawn on the bench or the like.

It will be appreciated that it is highly desirable on a draw bench, push bench or similar device, to be able to determine the exact output, either by a measurement of footage or by a count of the number of tubes or both or the like being drawn. It is therefore the object of this invention to provide a simple and effective mechanism which will automatically register the required data and which will thus allow ready control and checking of the output of each draw bench or the like.

According to our invention measuring means are provided which are actuated in proportion to the forward movement of the draw means, the means being brought into and out of operation by the die block through which the tubes or the like are being drawn, the die block for this purpose being itself movable so that when the block closes on to the tube to effect the required draw, the pressure generated will actuate this member to start the measuring device in operation, it being disengaged immediately the end of the tube is reached as the pressure on the die is then removed. The measuring means may take the form of suitably actuated counters or of recording pens or the like or both may be used in combination to give the required register.

In order however that the invention may be more fully understood it will now be described with reference to the accommpanying drawing designated Fig. 1 in which is shown schematically the mechanism and circuit diagram by means of which the desired measurements are obtained and that designated Fig. 2 which shows the record made by the mechanism.

Driven from the mechanism which actuates the draw chain or the like is a driver member 1 which revolves with the driving mechanism of the chain or the like.

Associated with this driver member 1 is a measuring member in the form of a clutch wheel 2 which is so arranged that it revolves once for each foot of movement of the draw chain or similar mechanism the clutch wheel 2 having on it a projecting pin 3 which once during each revolution closes a switch 4 for the purpose of completing an electrical circuit.

The clutch wheel 2 is mounted on a member 6 which is hinged at 7 to any suitable support so that the clutch wheel 2 can be pulled against the periphery of the driver member 1 when it is desired to effect a measurement.

The hinged member 6 is actuated from a solenoid 9 the flow of current to which is regulated by a switch 10 comprising a fixed contact 11 and a contact 12 loaded by a spring 13, the contact 11 being carried in an insulating block 14 in the fixed frame 15 which normally carries the die block, the spring loaded contact 12 being carried in an insulating block 16 in a movable die plate 17 which is spaced a short distance from the fixed frame member 15 and is held away therefrom by springs 19, the die plate 17 itself carrying the die 20 through which the tube or the like is to be drawn.

By means of the arrangement outlined the switch 10 is normally open but when a tube or the like is being drawn through the die 20, pressure generated in the die moves the die plate 17 towards the fixed frame member 15 against the resistance of the springs 19 thereby causing the contact 12 to be engaged on the contact 11 to close the switch 10.

In this way as soon as a draw commences the pressure on the die 20 closes the circuit which brings the clutch wheel 2 into engagement with the driver member 1, this clutch wheel 2 then revolving in direct proportion to the forward speed of the draw bench chain or similar moving member until the end of the tube or the like is reached. Immediately the end of the tube or other member being drawn is reached, the pressure is released from the die 20, this then allowing the die plate 17 to move back under influence of the springs 19 to open the switch 10.

By means of this mechanism the exact footage is registered by the clutch wheel 2, this footage being transmitted through electrical means to a counter 25 which is actuated once during each revolution of the clutch wheel 2 by the pin 3 closing the switch 4 and giving to the counter an impulse which moves on the mechanism one unit.

Also associated with the footage counter is a counter 26 which registers the number of articles drawn, this counter preferably being similar to the counter 25 but being placed into circuit through the switch 27 through delayed action mechanism started by means of the switch 10, the switch 27 being actuated by a solenoid 28 which is in turn energised through the closing of the switch 30 by the solenoid 31 when the switch 10 is first closed, the solenoid 31 being energised immediately the switch 10 is closed and also closing the switch 32 which places the solenoid 9 in operation, whereby the clutch wheel 2 is pulled against the driver member 1, into circuit.

To provide the required delay which is necessary to ensure that the grip which engages the tube or the like being drawn takes a firm hold, current is fed from the positive terminal 35 through the switch 30 and variable resister 36 and resister 37 to a gaseous discharge tube 38, a condenser 39 of sufficient capacity being shunted across the tube 38 to allow a delay period during which current is built up in the condenser before discharging across the tube 38, the flow of current across the tube 38 actuating the solenoid 28 previously referred to and closing the switch 27 to give an impulse to the counter 26. Actuation of the solenoid 28 at the same time closes the switch 40 which shunts out the resisters 36 and 37 as well as the tube 38 and condenser 39 so that the counter will only be actuated once for each closing of the switch 10 by the die 20 but the switches 27 and 40 will be held closed for the entire time of the draw so that a record can be made of the draw on a moving strip 42 which is wound from a spool 43 on to a spool 44 suitably driven at the required low speed by any means, the current passing through the resister 45 to a contact or pin 46 which electrically marks the moving strip 42 by a flow of current from the member 46 to the member 47 which is connected to the negative terminal 48 of the supply.

The record can be made on the strip 42 by using a treated strip of the type which will be discoloured when an electric current passes therethrough although this recording could be effected photographically or by other means.

A bleeder resistance 49 ensures that the member 46 is returned to earth potentially immediately the switch 10 is opened, a further bleeder resistance 50 brought into circuit through the switch 51 also discharging the condenser 39 at the end of the draw.

An indicator lamp 54 shows when a draw is being effected.

Arc suppressing resisters 55 and condenser 56 are placed across the switches 4, 27 and 32.

The current for the actuation of the various solenoids as well as for the time delay unit and for the operation of the indicators is drawn from the main supply through voltage dividers 58 and 59 which are shunted across the supply terminals 35 and 48, the supply terminals 35 and 48 being preferably connected across the driving motor of the draw bench or the like where this is a direct current motor.

It will be appreciated that the switch 10 can readily be fitted to the die plate of any draw bench or the like while the counting device can be fitted to the draw chain or other member which moves the tubes or the like forward through the die, it being the requirement of course that the clutch wheel 2 shall be revolved in direct proportion to the forward draw being effected.

The indicators 25 and 26 can be positioned at any required locality as well as the permanent recording unit utilising the strip 42, this latter unit preferably recording work being carried out on any number of draw benches or the like in the particular locality so that a record is given of the times in which such benches are in operation and also of the footage and number of tubes drawn, the recording strip 42 being for this purpose driven constantly and being independent of the switch 10.

What we claim is:

1. For draw benches or the like a quantity indicator comprising; a movable member carrying the die through which drawing is effected, switch means actuated by the movable member when the die is displaced by the drawing pressure, a driver member on a driven shaft of the bench which moves in proportion to the forward speed of the draw, a clutch wheel engageable on the said driver member, movable means supporting the said clutch wheel, and a relay electrically connected to the said switch means and coupled to the said movable means which support the said clutch wheel to move the said clutch wheel into engagement with the said driver member so long as pressure is exerted on the die.

2. For draw benches or the like, a quantity indicator comprising; a movable member carrying the die through which drawing is effected, switch means actuated by the movable member when the die is displaced by the drawing pressure, a driver member on a driven shaft of the bench which moves in proportion to the forward speed of the draw, a clutch wheel engageable on the said driver member, movable means supporting the said clutch wheel, a relay electrically connected to the said switch means and coupled to the said movable means which support the said clutch wheel to move the said clutch wheel into engagement with the said driver member so long as pressure is exerted on the die, a counter actuated by the said clutch wheel to register unit length, and a second counter actuated by the said switch means to register the number of draws.

3. For draw benches or the like, a quantity indicator comprising; a movable member carrying the die through which drawing is effected, switch means actuated by the movable member, a driver member on a driven shaft of the bench, a clutch wheel engageable on the said driver member, movable means supporting the said clutch wheel, a relay electrically connected to the said switch means and coupled to the said movable means which support the said clutch wheel to move the said clutch wheel into engagement with the said driver member so long as pressure is exerted on the die, a counter actuated by the clutch wheel to register unit length, a second counter actuated by the said switch means to register the number of draws, and means to delay the action of the second counter until a short length has been drawn.

4. For draw benches or the like, a quantity indicator comprising; a movable member carrying the die through which drawing is effected, a fixed frame member, springs between the movable member and the fixed frame member, switch means between the movable member and the fixed frame member, a driver member on a driven shaft of the bench which moves in proportion to the forward speed of the draw, a clutch wheel engageable on the said driver member, movable means supporting the said clutch wheel, and a relay electrically connected to the said switch means and coupled to the said movable means which support the said clutch wheel to move the said clutch wheel into engagement with the said driver member so long as pressure is exerted on the die.

5. For draw benches or the like a quantity indicator comprising; a movable member carrying the die through which drawing is effected, a fixed frame member, springs between the movable member and the fixed frame member, switch means between the movable member and the fixed frame member, a driver member on a driven shaft of the bench, a clutch wheel engageable on the said driver member, a movable means supporting the said clutch wheel, a relay electrically connected to the said switch means and coupled to the said movable means which support the said clutch wheel to move the said clutch wheel into engagement with the said driver member so long as pressure is exerted on the die, a counter actuated by the measuring member to register unit length, a second counter actuated by the said switch means to register the number of draws, and means to delay the action of the second counter unit until a short length has been drawn.

6. For draw benches or the like, a quantity indicator comprising; a movable member carrying the die through which drawing is effected, switch means actuated by the movable member, a driver member on a driven shaft of the bench, a clutch wheel engageable on the said driver member, movable means supporting the said clutch wheel, a relay electrically connected to the said switch means and coupled to the said movable means which support the said clutch wheel to move the said clutch wheel into engagement with the said driver member so long as pressure is exerted on the die, a counter actuated by the measuring member to register unit length, a second counter actuated by the said switch to register the number of draws, means to delay the action of the second counter until a short length has been drawn, and means to maintain the current on the second counter until the pressure is released from the die.

LESLIE HOLMES.
EDWARD O. BURNARD.
JOHN B. HIGGS.

REFERENCES CITED

The following references are of record in the file of this patent:

UNITED STATES PATENTS

| Number | Name | Date |
|---|---|---|
| 1,616,028 | Cooney | Feb. 1, 1927 |
| 1,936,208 | Pitt | Nov. 21, 1933 |
| 2,023,574 | Cohn | Dec. 10, 1935 |
| 2,283,993 | Holtz et al. | May 26, 1942 |
| 2,315,709 | Hudson | Apr. 6, 1943 |
| 2,432,727 | Crothers et al. | Dec. 16, 1947 |
| 2,437,101 | Larsen et al. | Mar. 2, 1948 |

FOREIGN PATENTS

| Number | Country | Date |
|---|---|---|
| 17,011 | Great Britain | 1912 |